Aug. 30, 1932.  F. A. GARRETT  1,874,180
BRAKE MECHANISM FOR THE WHEELS OF ROAD VEHICLES
Filed July 30, 1930   5 Sheets-Sheet 1
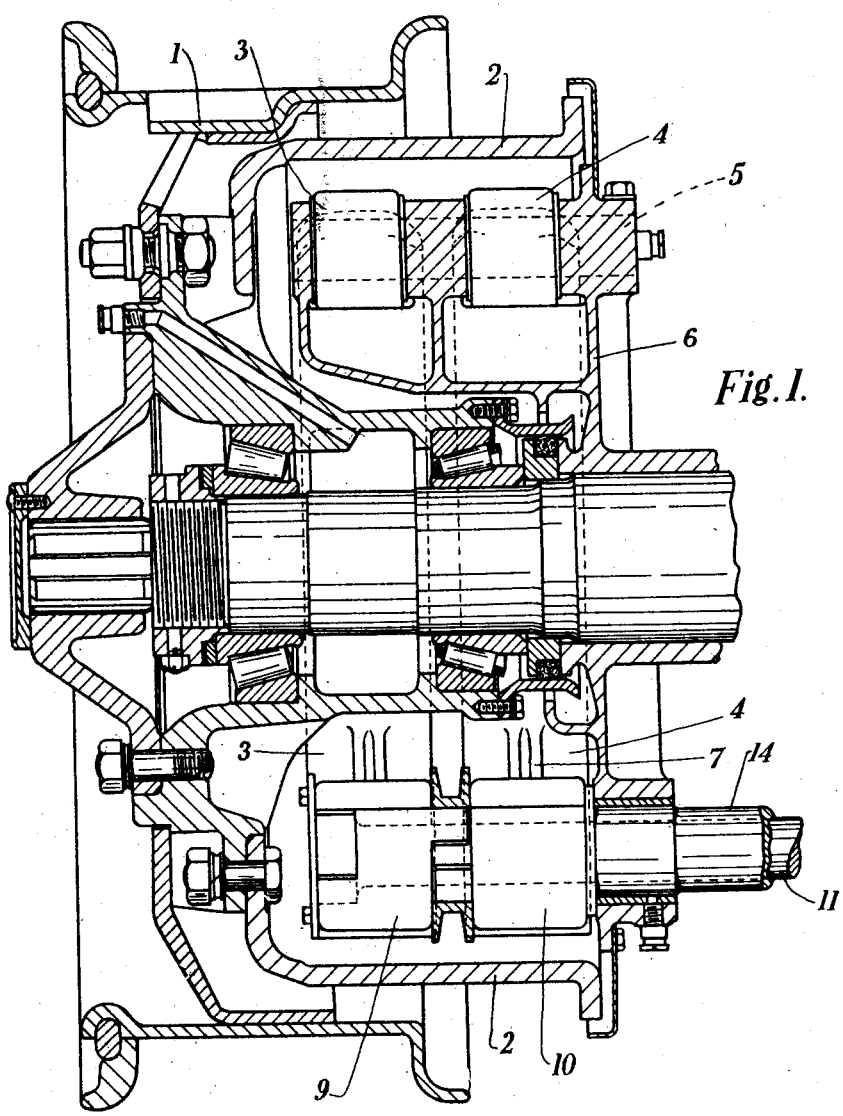
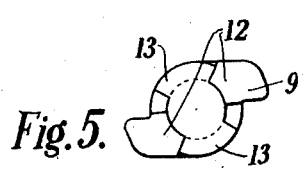
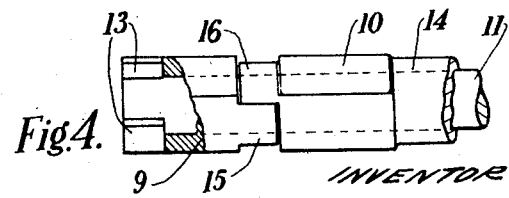

Aug. 30, 1932.  F. A. GARRETT  1,874,180
BRAKE MECHANISM FOR THE WHEELS OF ROAD VEHICLES
Filed July 30, 1930    5 Sheets-Sheet 2
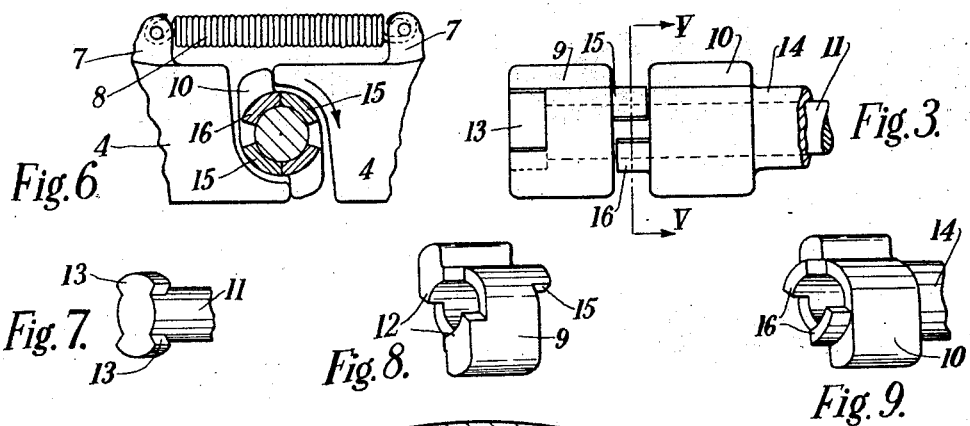
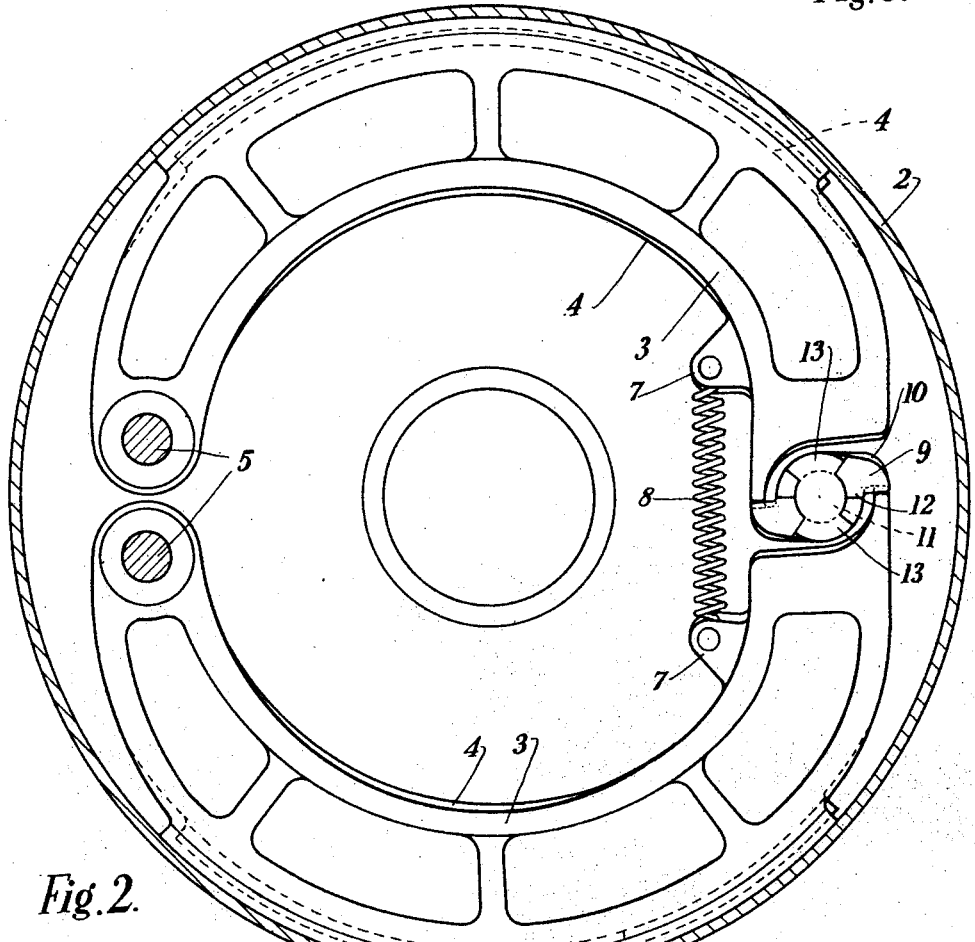
INVENTOR
F. A. GARRETT
BY [signature]
ATTY.

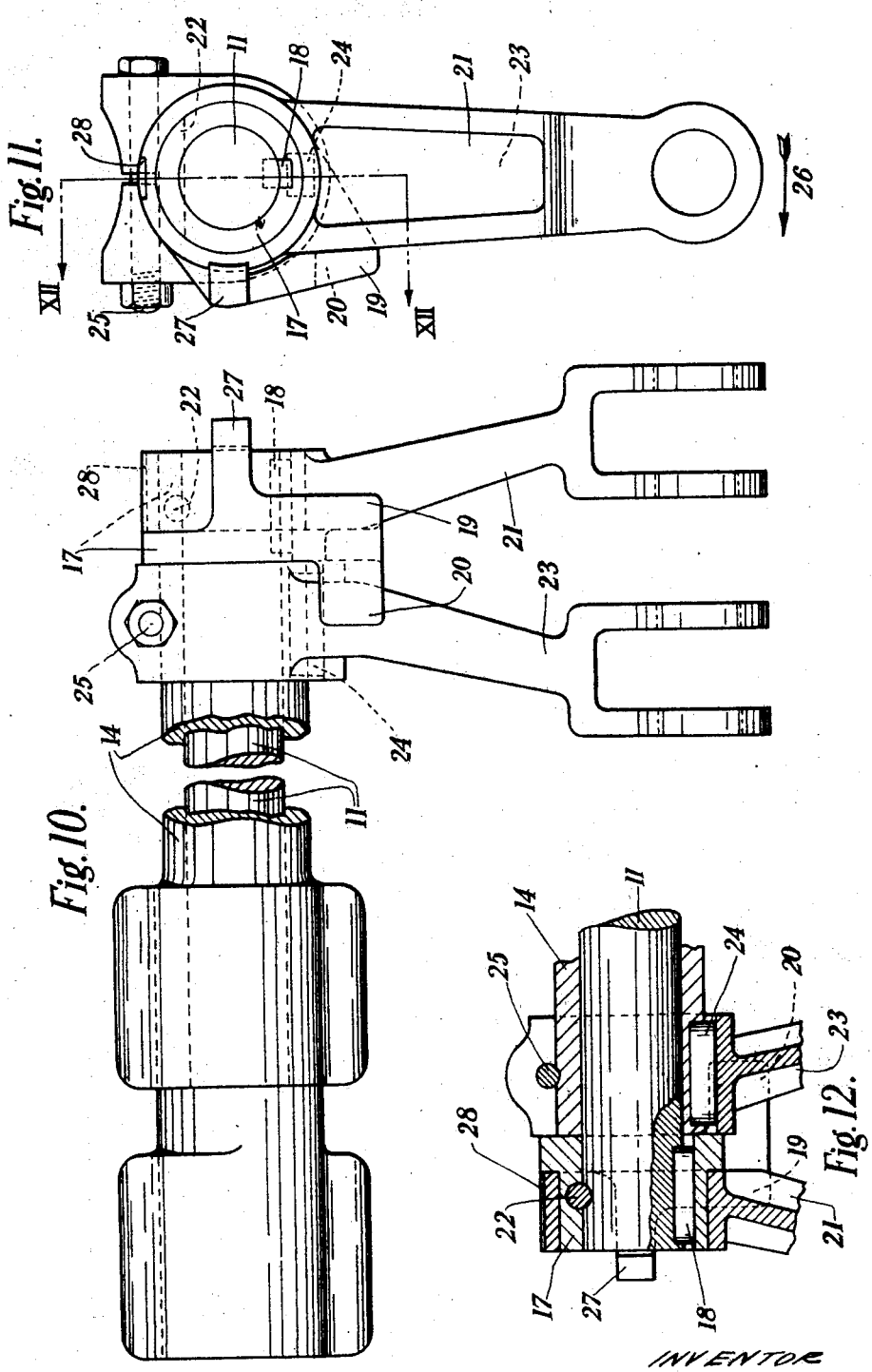

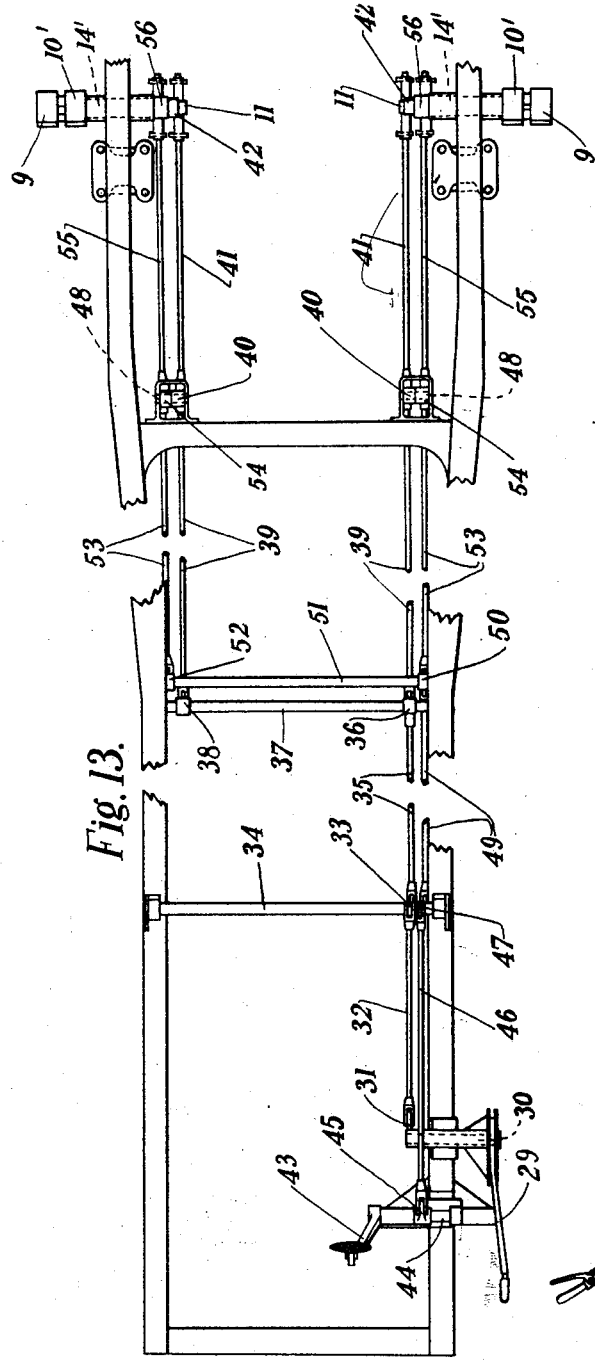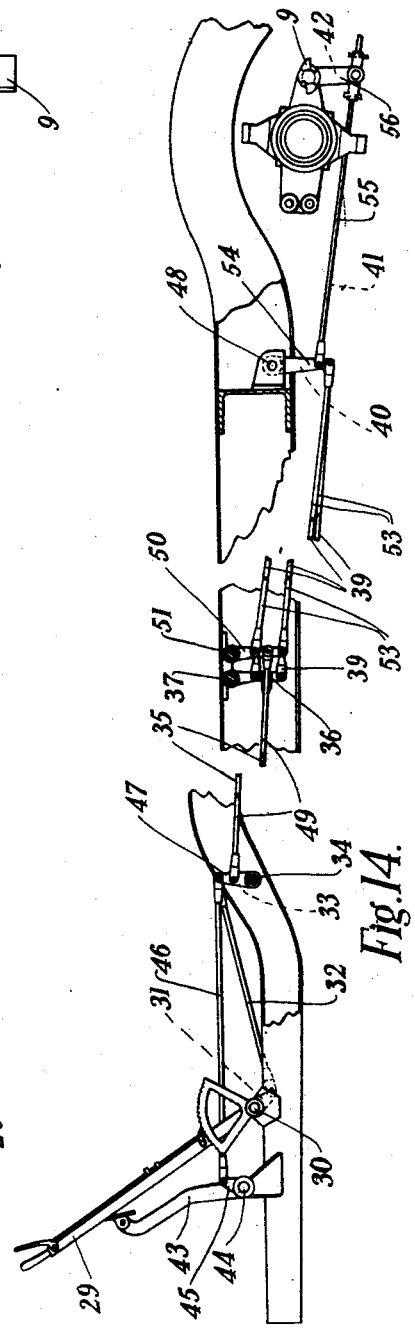

Aug. 30, 1932.  F. A. GARRETT  1,874,180
BRAKE MECHANISM FOR THE WHEELS OF ROAD VEHICLES
Filed July 30, 1930    5 Sheets-Sheet 5

INVENTOR
F.A.GARRETT
BY
ATTY.

Patented Aug. 30, 1932

1,874,180

UNITED STATES PATENT OFFICE

FRANCIS ALBERT GARRETT, OF IPSWICH, ENGLAND, ASSIGNOR TO RANSOMES, SIMS & JEFFERIES, LIMITED, OF IPSWICH, ENGLAND

BRAKE MECHANISM FOR THE WHEELS OF ROAD VEHICLES

Application filed July 30, 1930, Serial No. 471,781, and in Great Britain August 21, 1929.

The invention relates to brake mechanism for the wheels of road vehicles, such as motor cars, motor lorries, petrol buses or electric trolley buses, wherein the brake drums of the wheels to be braked are provided with duplicate sets of brake shoes operable by separate operating means.

In some cases it is customary to operate one set of shoes by a hand lever and the other set by a pedal, while in other cases one set of shoes is operated by a hand lever or by a pedal and the other by power such as by compressed air.

In such case, it has been found that the linings of one set of shoes become worn more quickly than the linings of the other set, and particularly when power operated brakes are used, necessitating frequent removal of the wheels and brake drums for renewal of the linings.

It has been proposed to avoid this difficulty by ensuring practically equal wear of the linings, mechanism being provided which is adapted to permit of the operation of one set of brake shoes only by one operative means and of the two sets of shoes together by the other operative means.

By this means, in the case of the power brakes, the extent of brake lining presented for wear on the brake drum surface is increased, for example, it may be twice that of the usual construction with corresponding increase in the life of linings without additional constructional weight.

It is an object of the present invention to provide a drum mounted rigidly on the wheel and provided with duplicate sets of internal brake shoes which are expanded by two coaxially mounted cam surfaces. Each cam forms part of a member which may be integral or may be composed of a plurality of parts rigidly connected together. Means are provided for engaging and operating one of the members independently of the member, so that only one set of brake shoes is expanded. Further means are provided for operating the other member and this second member is adapted operatively to engage the first member, so that it is operated simultaneously with the second member but independently of the first mentioned means for operating it, which remains stationary during this operation.

In the accompanying drawings:

Figure 1 is a front sectional elevation of a driving wheel, suitable for heavy power propelled road vehicles, fitted with a brake drum and with duplicate pairs of brake shoes of known form adapted for operation according to one form of the invention.

Figure 2 is a side sectional elevation of the brake drum showing the pair of hand brake shoes and the cam for operating them.

Figures 3, 4 and 5 are respectively, a front elevation, a plan partly in section and a side elevation of the cams for operating the brake shoes shown in Figure 1.

Figure 6 being a side sectional elevation on V—V, Figure 3, also showing adjacent parts of one pair of brake shoes.

Figure 7 is a perspective view of the dogs on the end of the hand brake shaft.

Figure 8 is a perspective view of the corresponding hand brake cam showing the dogs for co-operation with the dogs shown in Figure 7, and also one of the dogs for co-operation with corresponding dogs on the power brake cam which is shown in perspective in Figure 9.

Figure 10 is a front view showing two cams with their shafts partly broken, fitted with transmission levers provided with dog-clutches for use according to another form of the invention.

Figure 11 is a side view corresponding to Figure 10.

Figure 12 is a sectional view on the line XII—XII, Figure 11, of the bosses of the transmission levers and their dog clutches.

Figures 13 and 14 illustrate somewhat diagrammatically in plan and side elevation the brake rigging for a motor propelled vehicle provided with hand brake mechanism and pedal brake mechanism.

Figure 15:
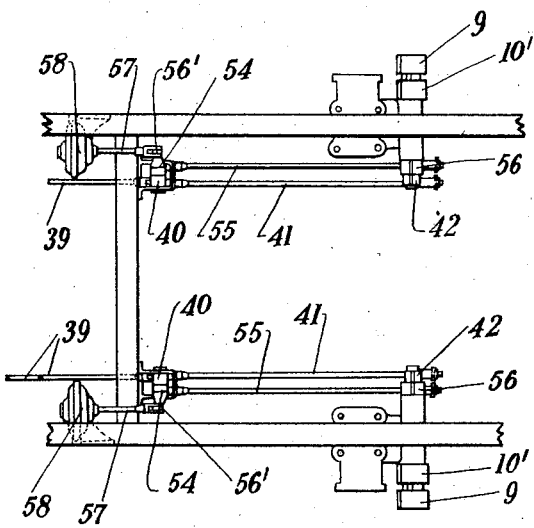
Figure 16:
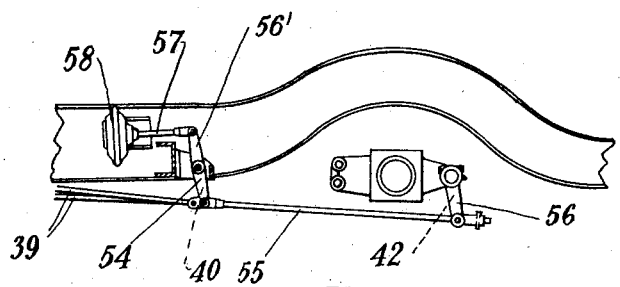

Figures 15 and 16 are similar views of the rear part only of brake rigging provided with manual, that is, hand or pedal brake mechanism and power brake mechanism.

The wheel 1 shown in Figure 1, is provided with a brake drum 2, and brake shoes 3 and 4, which it is assumed are respectively operated by hand and power. The brake shoes 3, 4, are of the usual segmental form arranged in pairs pivotally mounted at their upper ends on pins 5, Figure 2, only one shoe of each pair being seen in Figure 1. The pins 5 are carried by a stationary disc 6 in known manner, the lower adjacent ends of each pair of shoes being provided with lugs 7 connected by springs 8 as more clearly shown in Figure 6, the springs normally holding the shoes off the drum 2.

The pairs of brake shoes 3 and 4 are respectively applied to the drum 2 by cams 9 and 10 situated between their lower adjacent ends as usual in this type of brake, but in the present instance the cam 9 forms part of a member comprising, in addition to the cam 9, dogs 12 and dogs 15, and the cam 10 forms part of a second member comprising, in addition to the cam 10, dogs 16 and a hollow shaft 14. The brake shoes 3 will be referred to hereinafter as the hand brake shoes and the brake shoes 4 as the power brake shoes. The hand brake member which includes the cam 9 is freely mounted on a shaft 11 which is operated by any suitable mechanism from the driver's hand brake lever. As indicated more clearly in Figures 5, 7 and 8, the member has two dogs 12 and the adjacent end of the shaft 11 has two dogs 13 for co-operation therewith, the arrangement forming a dog-clutch. The dogs 13 are narrower than the spaces between the dogs 12 so that a certain degree of relative angular movement is possible between the member and the dogs 13. The hollow shaft or sleeve 14 rotatable relatively to the shaft 11 is connected by any suitable means to the power operating mechanism. As indicated more clearly in Figures 6, 8 and 9, the power brake shaft 14 has the power-brake cam 10 preferably formed integrally with it. The member including the cam 9 has two dogs 15 for co-operation with two dogs 16 on the member including the cam 10, the relative widths of the dogs being such that a certain degree of relative movement is possible between them.

When the hand brake shaft 11 is partly rotated by the driver to apply the hand brake shoes 3 only, the dogs 12 engage with the dogs 13 and partly rotate the hand brake cam 9, when the dogs 15 merely recede from the dogs 16, so that the hand brake shoes 3 only are applied to the brake drum 2. On the contrary, when the power brake shaft 14 is partly rotated to apply the power brake shoe 4, the power brake cam 10 is partly rotated and the dogs 16 engage with the dogs 15 so that the two cams 9 and 10 are compelled to move together, so that both sets of brake shoes 3 and 4 are applied to the drum 2 simultaneously. The hand brake shaft 11 under these conditions remains stationary owing to the clearance between the dogs 12 and 13.

It will be understood that the shafts 11 and 14 of one wheel brake may be connected by any well known form of brake rigging to the corresponding shafts of the other wheel brakes on the vehicle for simultaneous operation of all corresponding sets of shoes by the driver's hand brake lever and power mechanism.

Instead of arranging the dog clutches immediately adjacent to the cams, they may be provided in any convenient position between the shafts 11 and 14, for example, as illustrated by Figures 10 to 12, they may be provided between the transmission levers which rotate these shafts and are connected to the brake rigging. In this form a boss 17 is fixed by a key 18 to the hand brake shaft 11. It has two dogs 19 and 20. A lever 21, which is connected to the hand brake rigging, is freely mounted on the boss 17.

A lever 23, which is connected to the power brake rigging, is fixed to the power brake shaft 14 by a key 24 and by means of a clamping bolt 25.

In this form, the shaft 11 and the cam 9 are integral, and the cam 9, the shaft 11 and the boss 17 together form one member, whilst the cam 10, the hollow shaft 14 and the transmission lever 23 together form a second member.

When the lever 21 is operated to apply the hand brake shoes, it is moved in the direction of the arrow 26. It engages with the dog 19, so that the hand brake shaft 11 alone is partly rotated, the dog 20 merely receding from the lever 23 which remains stationary.

When, however, the lever 23 is moved in the direction of the arrow 26 to apply the power brake shoes, it engages with the dog 20 so that the hand brake shaft 11 is partly rotated as well as the power brake shaft 14, the dog 19 receding from the hand brake lever 21 which remains stationary.

An overhanging lug 27 is provided on the boss 17 to prevent the lever 21 slipping off the end of the shaft 11. A recess 28 in the boss of the lever 21 facilitates removal or replacement of the lever from or on the boss 27.

It will be understood that the brake rigging varies considerably according to the type of motor propelled road vehicle to which the invention is to be applied and the number of wheels which have to be braked and any suitable construction or arrangement of rigging well known in the art can be adopted.

Figures 13 and 14 illustrate a simple example in which two wheels have to be braked, one set of brake shoes being operated by a hand lever and the other set by a pedal.

Figures 15 and 16 illustrate a similar example, it being assumed that one pair of brake shoes is operated by a hand lever and the other pair by power brake mechanism.

In both instances, it is assumed that the brake cams are provided with dog clutches similar to those hereinbefore described with reference to Figures 1 to 9.

It will be understood that in a six wheeled vehicle it is sometimes customary to brake four rear wheels, the brake rigging being extended accordingly.

In Figures 13 and 14, a hand brake lever 29 is fixed to a pivotal shaft 30 provided with a lever 31 pivotally connected to the adjacent end of a pull rod 32, the opposite end of which is pivotally connected to a lever 33 freely mounted on a shaft 34.

The adjacent end of a pull rod 35 is pivotally connected to the lever 33 while its opposite end is pivotally connected to a lever 36 fixed on a shaft 37 near one end, another lever 38 being fixed on to the shaft 37 near its other end. The two levers 36 and 38 are pivotally connected to the adjacent ends of draw rods 39, the opposite ends of which are pivotally connected to levers 40, freely mounted on pins 48 and in turn pivotally connected to draw rods 41, which are finally pivotally connected to levers 42, fixed to the hand brake shafts 11, carrying the hand brake cams 9.

A pedal 43 is mounted on a pivotal shaft 44 having a lever 45 pivotally connected to the adjacent end of a draw rod 46, the opposite end of which is pivotally connected to a lever 47 freely mounted on the shaft 34, and pivotally connected to the adjacent end of a draw rod 49, the other end of which is pivotally connected to a lever 50 mounted on one end of a shaft 51 having another lever 52 mounted on its opposite end. The levers 50 and 52 are pivotally connected to the adjacent ends of draw rods 53, the opposite ends of the rods 53 being pivotally connected to levers 54, freely mounted on the pins 48 and are pivotally connected to draw rods 55 which are pivotally connected to levers 56 fixed to the shafts 14', 14' provided with the pedal brake cams 10', 10'. The cams 9 and 10' and shafts 11 and 14' are assumed to be provided with dog clutches similar to those described with reference to Figures 1 to 9, the shafts 14' and cams 10' corresponding to the shaft 14 and cam 10 of those figures.

Operation of the hand brake lever 29 will thus rotate the hand brake cams 9, 9 to apply the hand brake shoes whereas operation of the pedal 43 will result in both sets of cams 9, 9 and 10', 10' being rotated to apply both sets of brake shoes together.

In Figures 15 and 16, similar reference numerals indicate corresponding parts to those in Figures 13 and 14, but the levers 54 instead of being operated by a pedal and connected rigging are provided with arms 56' pivotally connected to the rods 57 of power cylinders 58 well known in the art and controlled by the driver by the usual means. In this example when the draw rods are pulled by the driver's hand brake lever, the hand brakes only are applied, whereas when the driver sets the power cylinders in operation, both sets, namely, the hand and the power brakes, are applied. Instead of the rigging, which includes the draw rods 39, being operating by a hand lever, it may be operated by a pedal, that is to say, by the driver, either by a pedal or a hand lever and the term manual operation is used in the appended claims to mean either hand or pedal operation.

I claim:

1. Brake mechanism for the wheel of a motor propelled or other road vehicle, comprising a brake drum, duplicate pairs of brake shoes for said drum, a shaft having a cam fixed to it for operating one pair of brake shoes, another shaft having a cam freely mounted on it for operating the other pair of brake shoes, a dog clutch between said freely mounted cam and its shaft to ensure a driving connection therewith and another dog clutch between the two cams adapted to ensure a driving connection between them when the fixed cam is operated by its shaft.

2. Brake mechanism for the wheel of heavy motor propelled and other road vehicles, comprising a brake drum rigidly mounted on said wheel, duplicate sets of internal brake shoes mounted within said drum, a cam shaft having a cam surface for cooperating with one of said brake shoes, a boss rigidly mounted thereon and a transmission lever freely mounted thereon and adapted to engage said boss and partially rotate said cam shaft, and a second cam shaft coaxial with said first mentioned cam shaft, having a cam surface for cooperating with the other of said brake shoes and a transmission lever rigidly mounted thereon adapted to partially rotate said second cam shaft and by engagement with the boss mounted on said first cam shaft simultaneously partially rotate it independently of said freely mounted transmission lever which remains stationary.

In testimony whereof I have signed my name to this specification.

FRANCIS ALBERT GARRETT.